US012473744B1

United States Patent
Jackson

(10) Patent No.: US 12,473,744 B1
(45) Date of Patent: Nov. 18, 2025

(54) PORTABLE AND RETRACTABLE ROOF APPARATUS

(71) Applicant: Andrew Jackson, Coxs Mills, WV (US)

(72) Inventor: Andrew Jackson, Coxs Mills, WV (US)

(*) Notice: Subject to any disclaimer, the term of this patent is extended or adjusted under 35 U.S.C. 154(b) by 200 days.

(21) Appl. No.: 18/406,141

(22) Filed: Jan. 6, 2024

Related U.S. Application Data

(60) Provisional application No. 63/489,364, filed on Mar. 9, 2023, provisional application No. 63/482,047, filed on Jan. 29, 2023.

(51) Int. Cl.
*E04H 15/04* (2006.01)
*A01M 31/02* (2006.01)
*E04F 10/06* (2006.01)
*E04H 15/08* (2006.01)

(52) U.S. Cl.
CPC ............ *E04H 15/04* (2013.01); *A01M 31/02* (2013.01); *A01M 31/025* (2013.01); *E04F 10/0607* (2013.01); *E04F 10/0685* (2013.01); *E04H 15/08* (2013.01); *E04F 10/0662* (2013.01); *Y10S 135/901* (2013.01)

(58) Field of Classification Search
CPC ........ E04H 15/04; E04H 15/08; A01M 31/02; A01M 31/025; Y10S 135/901; E04F 10/0607; E04F 10/0685; E04F 10/0662
USPC .......................................... 135/90, 901, 903
See application file for complete search history.

(56) References Cited

U.S. PATENT DOCUMENTS

| | | | | | |
|---|---|---|---|---|---|
| 2,788,791 | A | * | 4/1957 | Pospisil ................. | E04H 15/06 135/904 |
| 3,116,808 | A | * | 1/1964 | Riley ..................... | A01M 31/02 135/900 |
| 3,990,536 | A | * | 11/1976 | Wilburn ................ | A01M 31/02 182/20 |
| 4,505,286 | A | * | 3/1985 | Madion ................. | A01M 31/02 135/117 |
| 4,739,785 | A | * | 4/1988 | Poulson ............... | E04H 15/001 135/900 |
| 4,754,774 | A | * | 7/1988 | Leader ................... | E04H 15/06 135/120.2 |
| 6,782,936 | B1 | * | 8/2004 | Girard .................. | E04F 10/0648 160/67 |
| 7,222,634 | B2 | * | 5/2007 | Hess .................... | A01M 31/025 135/93 |
| 7,958,968 | B1 | * | 6/2011 | Stabler .................. | E04H 15/04 135/901 |
| 8,863,765 | B2 | * | 10/2014 | Heilman ............. | A01M 31/025 135/96 |

(Continued)

*Primary Examiner* — Robert Canfield
(74) *Attorney, Agent, or Firm* — Karen Tang-Wai Sutton

(57) ABSTRACT

A portable and retractable roof having a rotatably retractable cover housed inside a case and attached to a spindle rotatably housed inside the case. The case is removably affixed to a tree trunk by a tree mount disposed as a frame attached to the case and attached to the trunk by a strap. The cover, when extended, is attached to and supported by a frame assembly attached to both the cover and to either the case or the tree mount. A skirt portion removably affixed to the frame assembly is also provided. In use, the cover is rotatably extended out so as to serve as a roof and rotatably retracted to store in the case. A method of use is also provided.

15 Claims, 13 Drawing Sheets

(56) References Cited

U.S. PATENT DOCUMENTS

| | | | | |
|---|---|---|---|---|
| 8,997,768 B1* | 4/2015 | Bourne | ............... | E04H 15/08 135/96 |
| 2006/0249640 A1* | 11/2006 | Hanson | ............... | A01M 31/025 135/90 |
| 2016/0143264 A1* | 5/2016 | Blaha | ............... | E04H 15/04 135/96 |

* cited by examiner

SECTION A-A

PORTABLE AND RETRACTABLE ROOF APPARATUS

CROSS-REFERENCE TO RELATED APPLICATIONS

This application claims priority from U.S. provisional application Ser. No. 63/482,047 file on 29 Jan. 2023 and U.S. provisional application Ser. No. 63/489,364 filed 9 Mar. 2023, both of which are hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE ONLINE PATENT CENTER SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to a roof assembly, specifically, a portable and retractable roof for temporary weather protection.

DISCLOSURE OF INVENTION

A portable roof for mounting to a trunk of a tree having a case disposed as an elongated box in two embodiments, a first embodiment being a four sided box with a removable lid, and an elongated opening opposite the lid, the case having a triangular or trapezoidal cross section and the lid and four sides defining an interior storage space housing a spindle and a cover attached thereto, retractable or extendable out of the case through the elongated opening.

In a second embodiment, the interior storage space is divided into an upper storage area covered by the lid and a lower storage area or spindle housing having five sides and an open side, inside which the spindle is positioned, with the open side being the elongated opening through which the cover is retractable or extendable from the case. A second lid to cover the elongated opening is disclosed for use with either or both the first embodiment and the second embodiment of the case. The spindle is rotatably affixed to the interior of the case. The cover having a free end and a fixed end is affixed to the spindle at the fixed end with the free end rotatably extendable out of the elongated opening so as to be in an extended position. A frame assembly disposed as a pair of side tubes and at least one cross tube removably affixed to the pair of side tubes so as to be perpendicular to the side tubes and approximately parallel with the elongated opening is removably attached to a tree mount affixed to a tree side of the case. The assembled frame assembly supports the cover when in its extended position. The cover is removably secured to the frame assembly. The frame assembly can be disassembled and stored inside the case interior space accessible by removing the lid.

In a first aspect of the invention, the tree mount is disposed as frame having a first end, a second end, and a trunk engaging portion positioned between the first end and the second end, each of the first end and the second end terminating in a receiver mateable with the back end of one of the side tubes of the frame assembly.

In a second aspect of the invention, the portable roof is further comprised of a skirt portion and a rail, the skirt adapted to be removably attached to the frame assembly or to the rail attached to the frame assembly.

In a third aspect of the invention, the frame assembly is further comprised of a front tube perpendicular to and attached to the pair of side tubes. The side tubes, cross tube and front tube are attached by an elasticized cord.

In a fourth aspect of the invention, the spindle is further comprised of a first spindle end and a second spindle end, and a knob affixed to either the first spindle end or to the second spindle end, whereby manually rotating the knob rotates the spindle in a same direction of rotation as that of the knob. The spindle is alternatively rotatable using a motor assembly.

In a fifth aspect of the invention, the cover is made of a weather resistant material.

In a sixth aspect of the invention, a method of using a portable roof having a case, a tree mount attached to the case so as to be mountable to a trunk of a tree, a frame assembly, and a retractable cover rotatably housed inside the case and rotatably extended out of the case and supported by the frame assembly so as to form a temporary roof structure, comprises the steps of mounting the portable roof to the trunk, assembling the frame assembly, attaching the assembled frame assembly to either the case or to the tree mount, and extending the cover from the case above the frame assembly, whereby the cover is supported by the frame assembly.

In a seventh aspect of the invention, the method is further comprised of the step of attaching the cover to the frame assembly after the step of extending.

In an eighth aspect of the invention, the method is further comprised of the steps of detaching the cover from the frame assembly after the step of attaching the cover and retracting the cover into the case after the step of detaching the cover.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
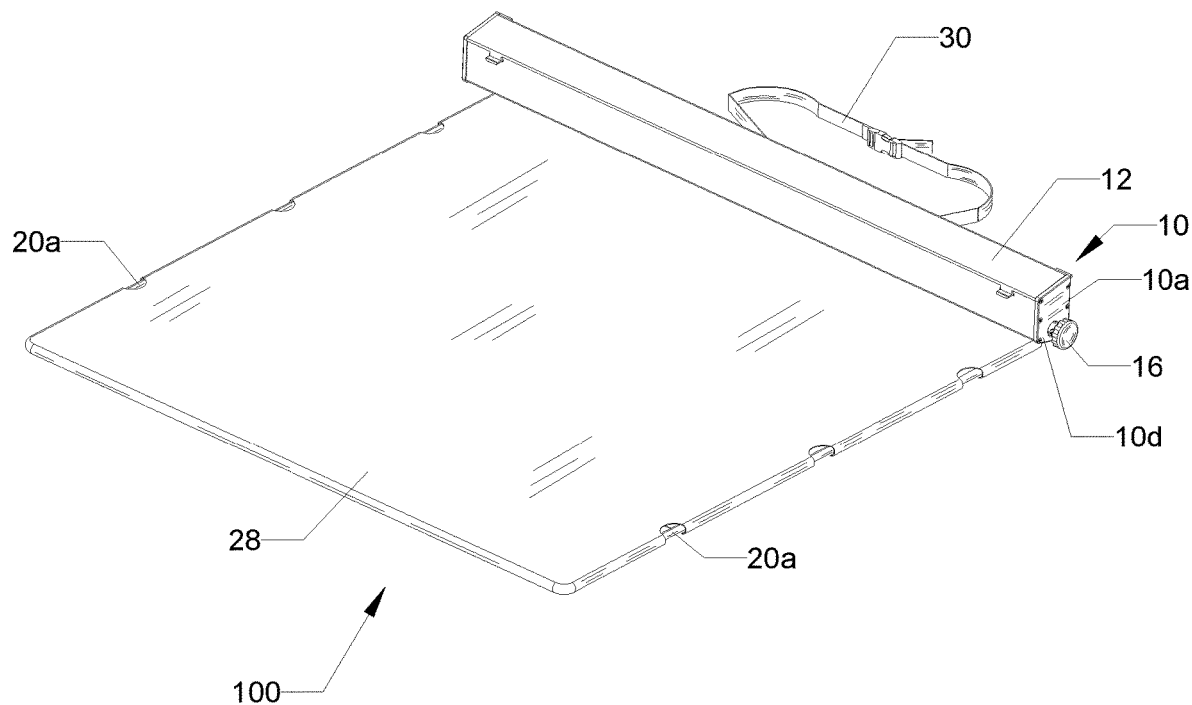
FIG. 1 is a perspective view of a portable and retractable roof assembly according to the invention.

The following is a list of reference labels used in the drawings to label components of different embodiments of the invention, and the names of the indicated components.

100 portable and retractable roof assembly or roof
10 case
10a case side
10b first side of case or front side
10c second side of case or tree facing side or trunk facing side or trunk side or tree side
10d third side of case or bottom facing or ground facing side or elongated opening
10e floor
10f spindle housing
10g upper interior storage compartment
10h case aperture
12 lid
14 spindle assembly
14a spindle first end
14b spindle second end
14c spindle bracket
14d friction disk
14e spindle end
14f spindle
16 knob
20 frame assembly
20a side tube
20b cross tube
20c front tube
24 nylon strap
26 tree mount
26a side tube receiver
26b bracket
28 cover
28a side flap
28b front pocket
30 strap
32 skirt
32a skirt clip
32b rail
50 trunk of a tree or tree trunk
52 hunting stand

DETAILED DESCRIPTION

Figure 2:
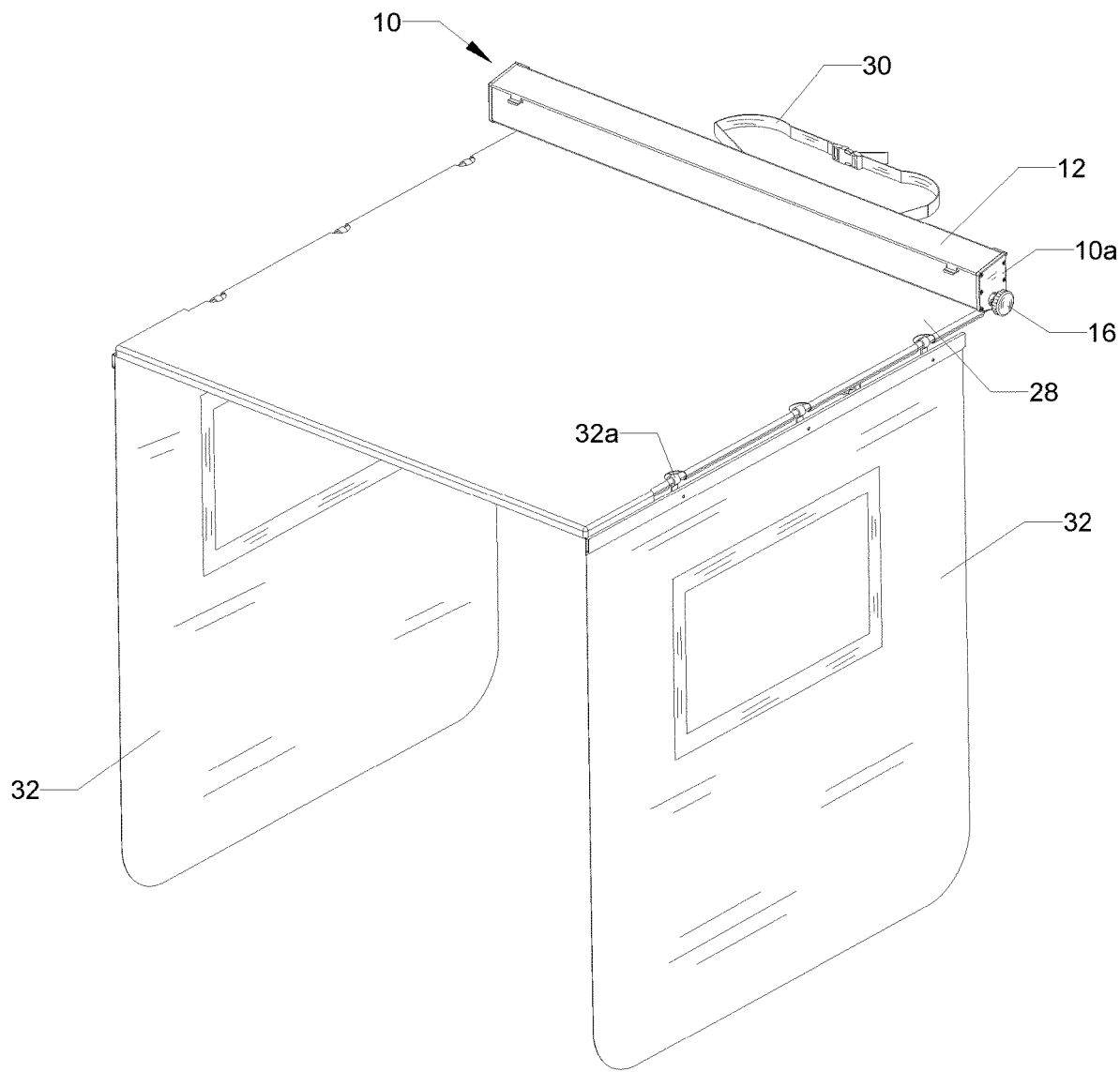
FIG. 2 is a perspective view of the portable and retractable roof assembly in FIG. 1, shown with a pair of removable side skirts.
Figure 3:
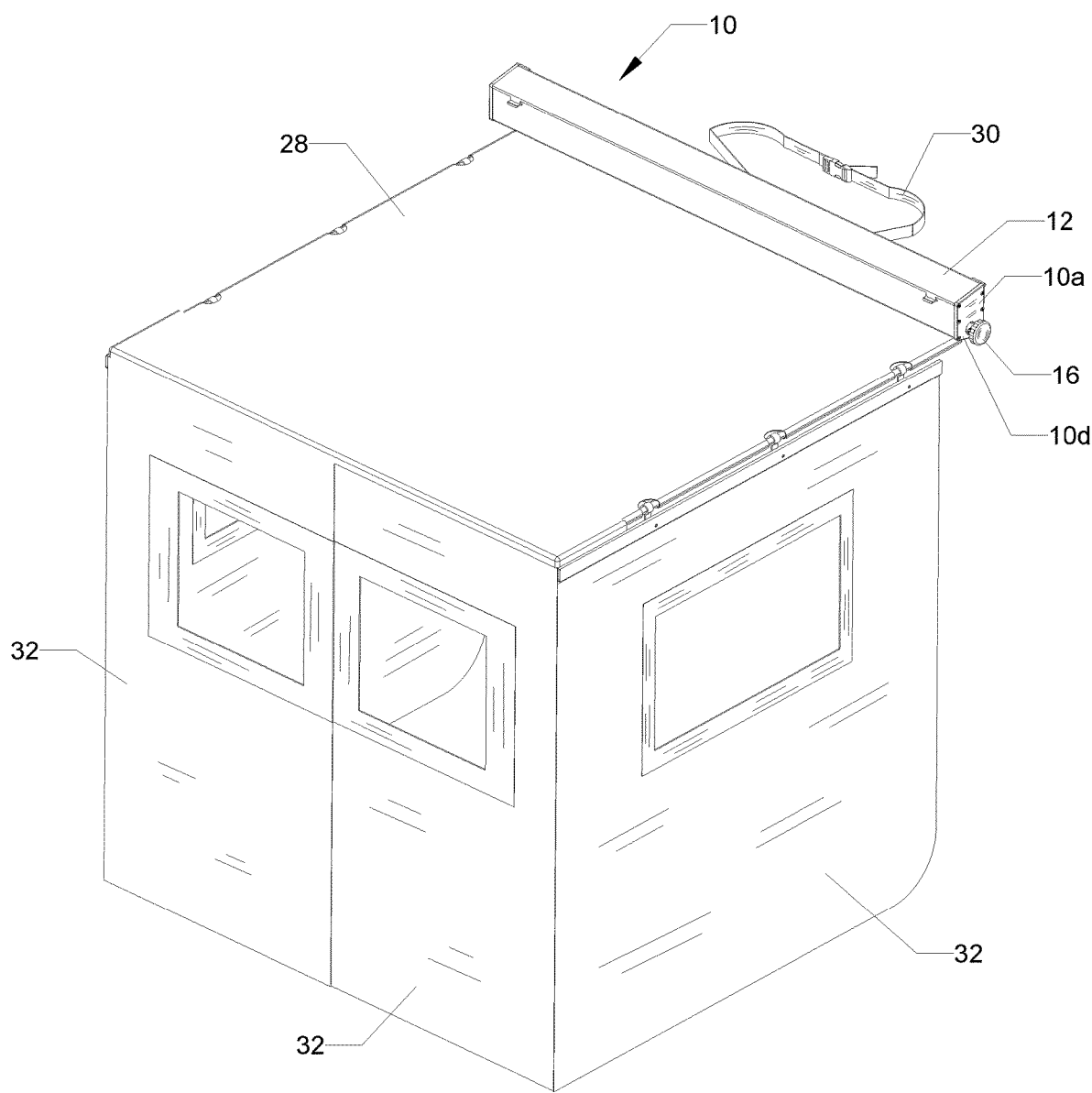
FIG. 3 is a perspective view of the portable and retractable roof assembly in FIG. 2, shown with the pair of removable side skirts and front skirts.
Figure 4:
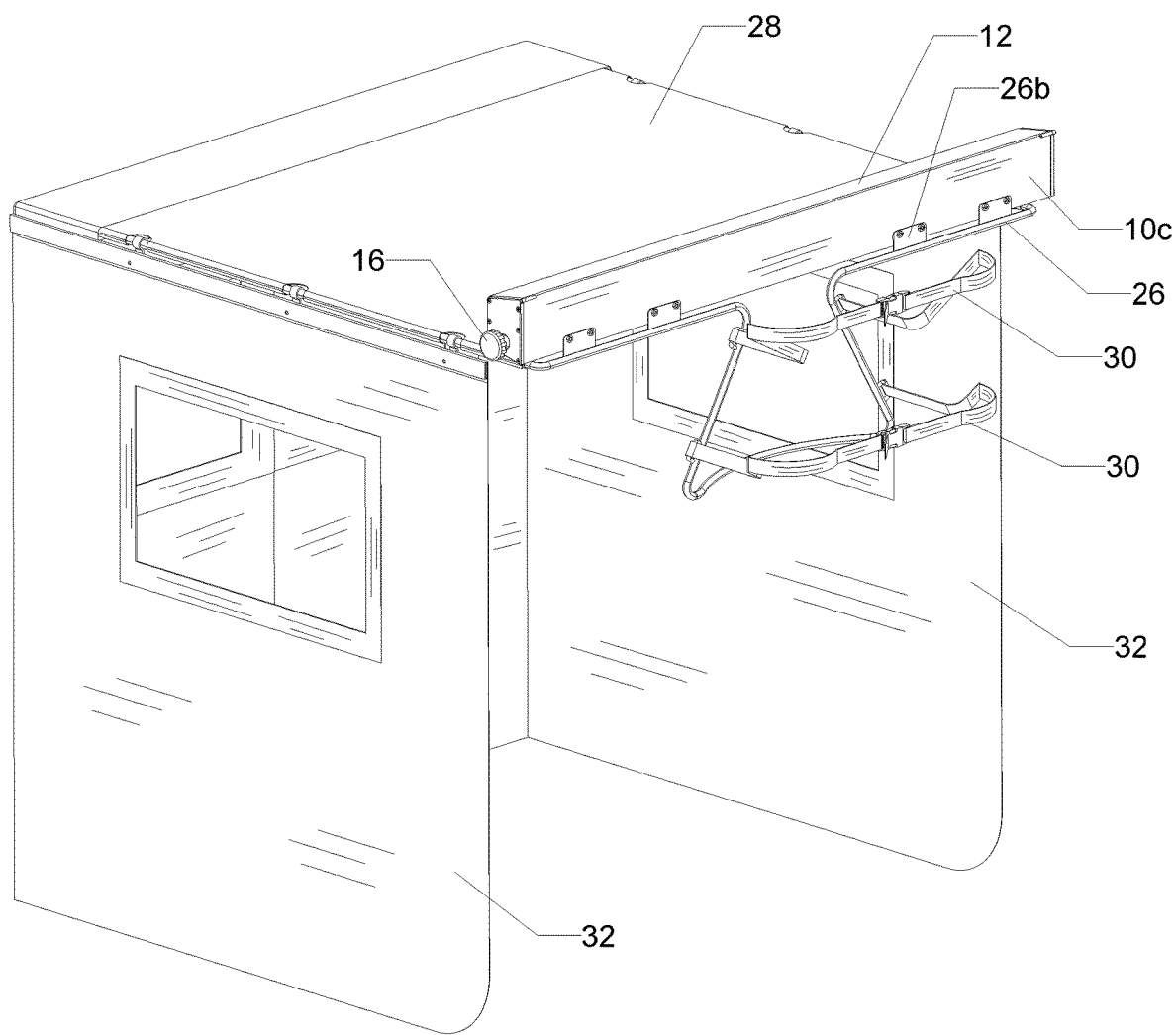
FIG. 4 is a back perspective view of the portable and retractable roof assembly in FIG. 3.
Figure 5:
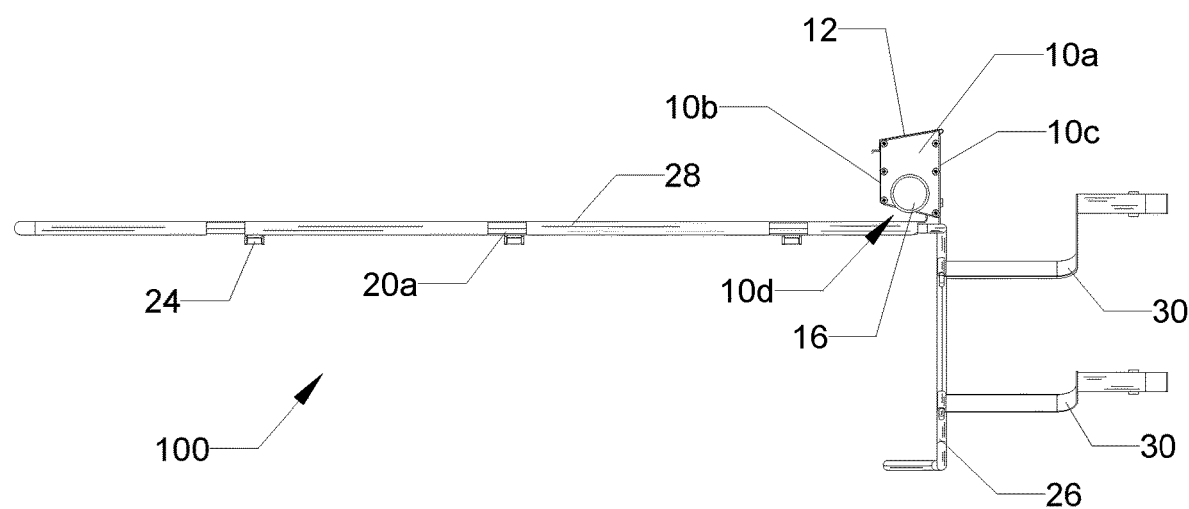
FIG. 5 is a side elevation view of the portable and retractable roof assembly in FIG. 1.
Figure 6:
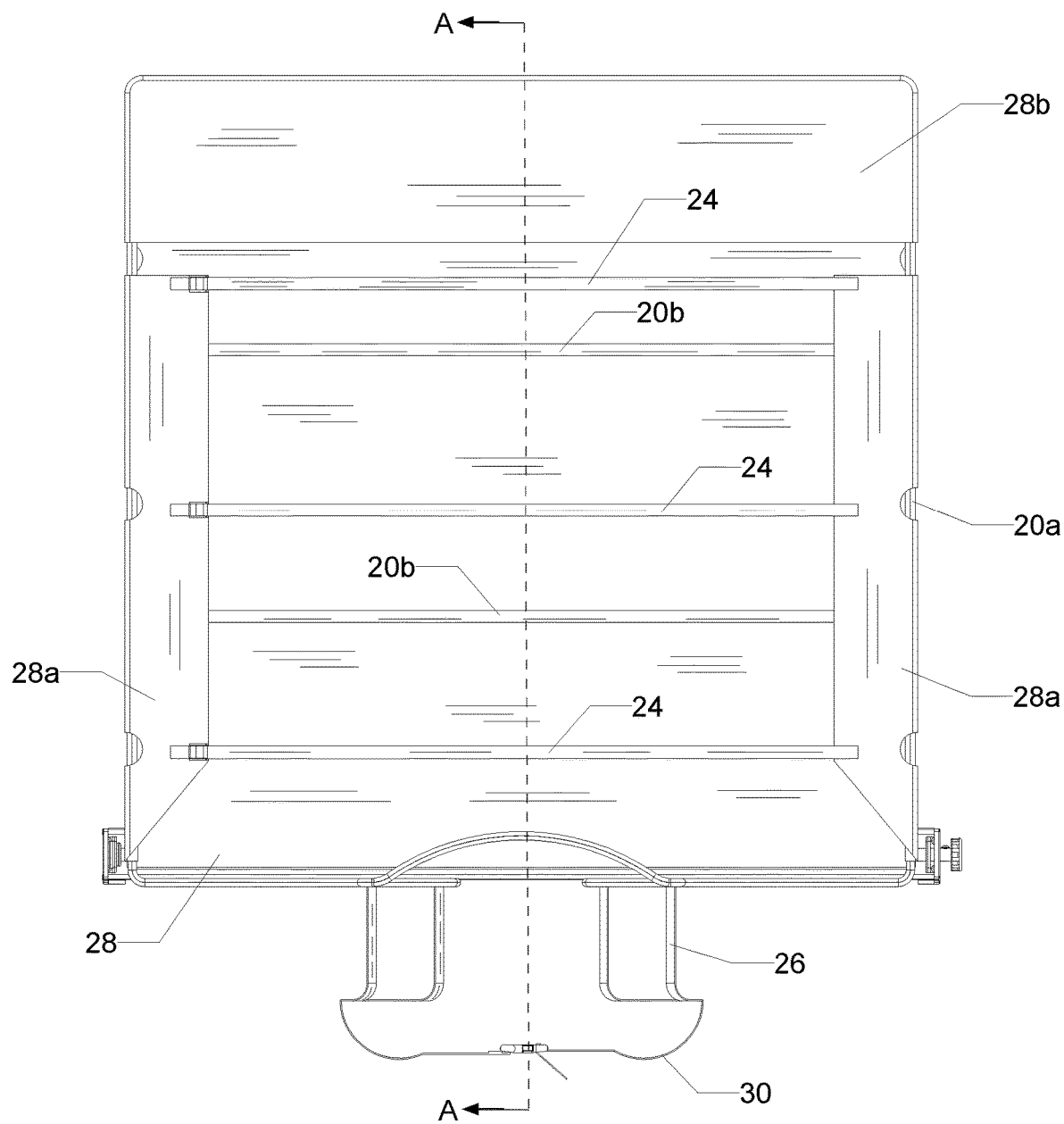
FIG. 6 is a bottom elevation view of the portable and retractable roof assembly in FIG. 1.
Figure 7:
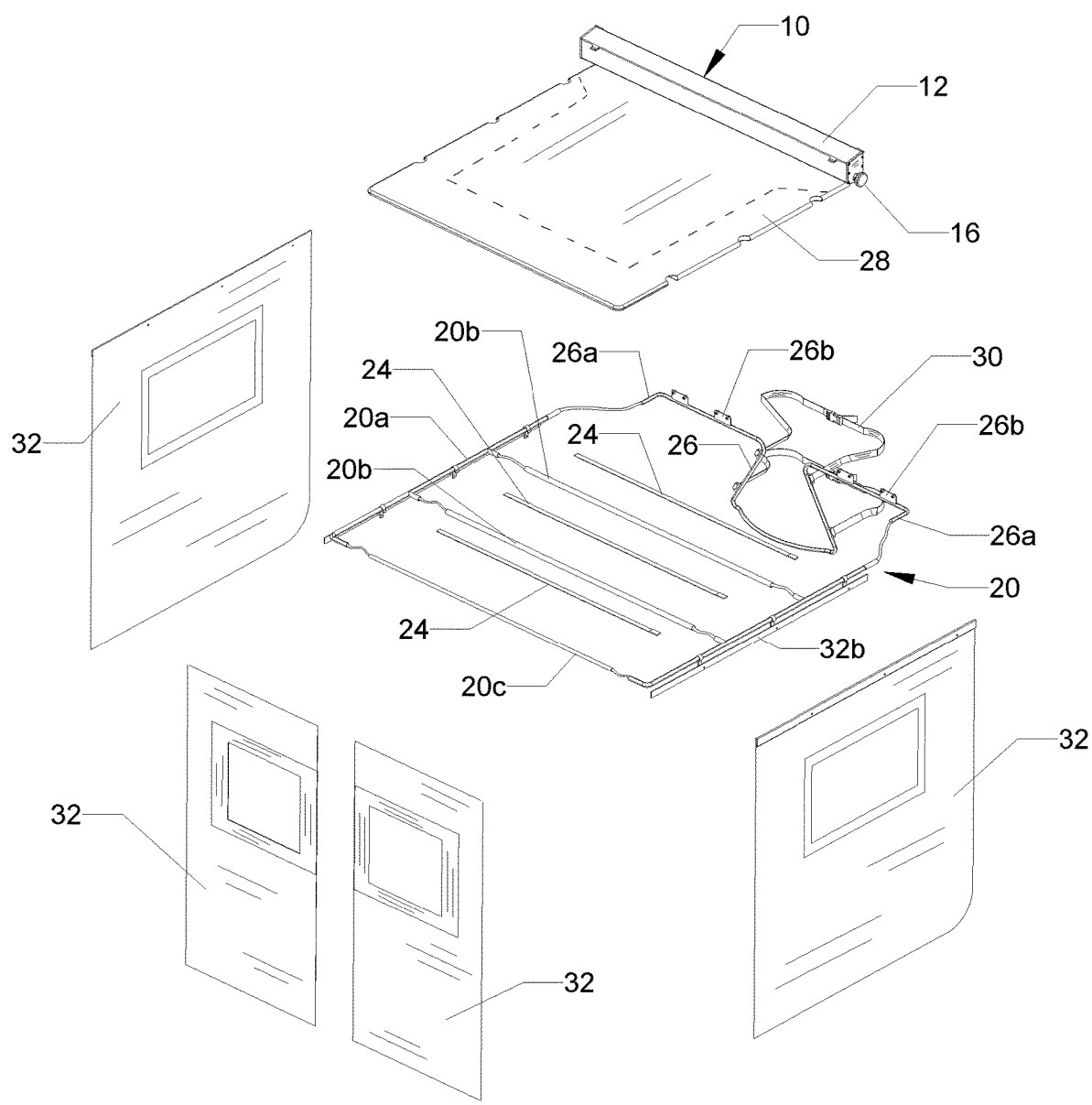
FIG. 7 is an exploded view of the portable and retractable roof assembly in FIG. 3.
Figure 8:
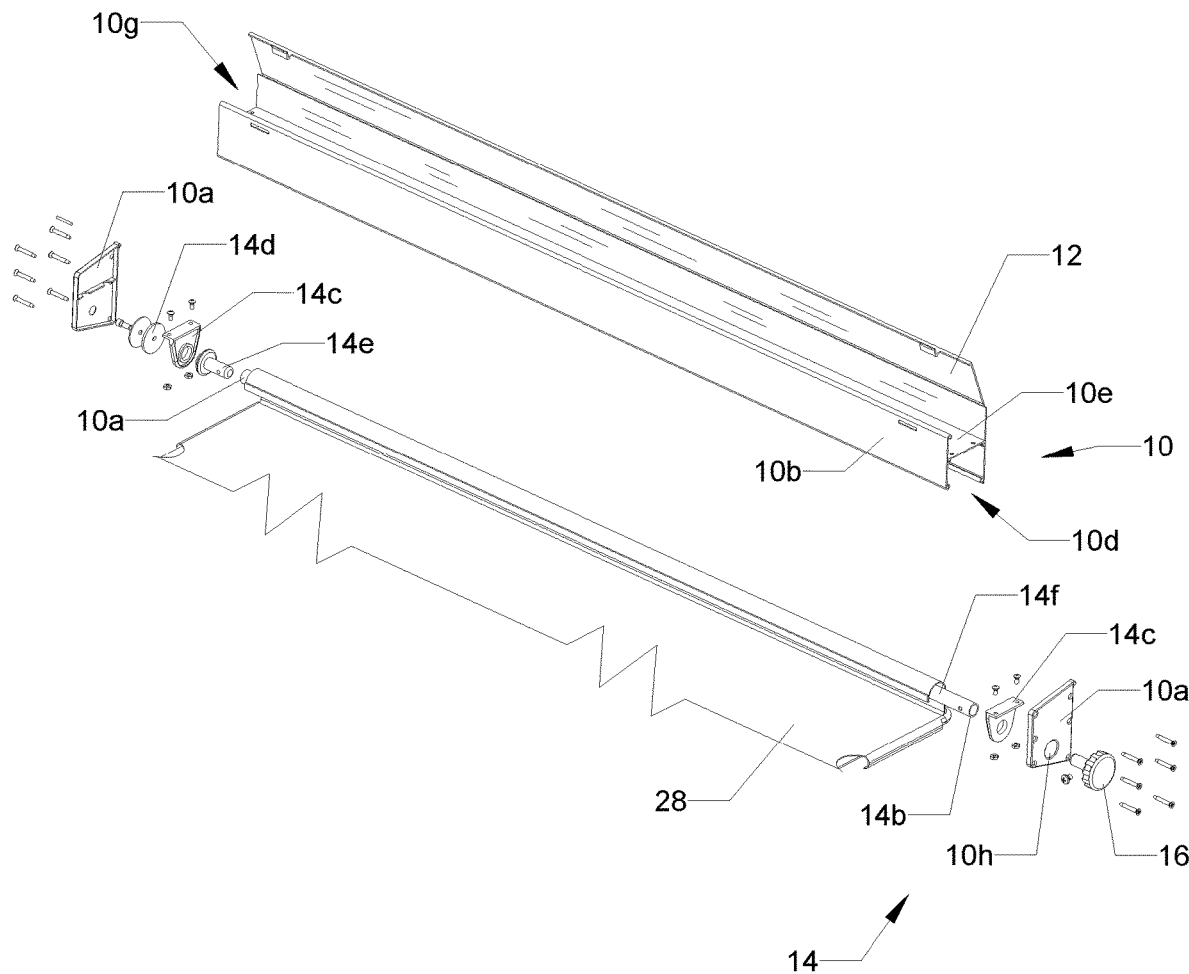
FIG. 8 is an exploded view of a case and spindle assembly according to the invention.
Figure 9:
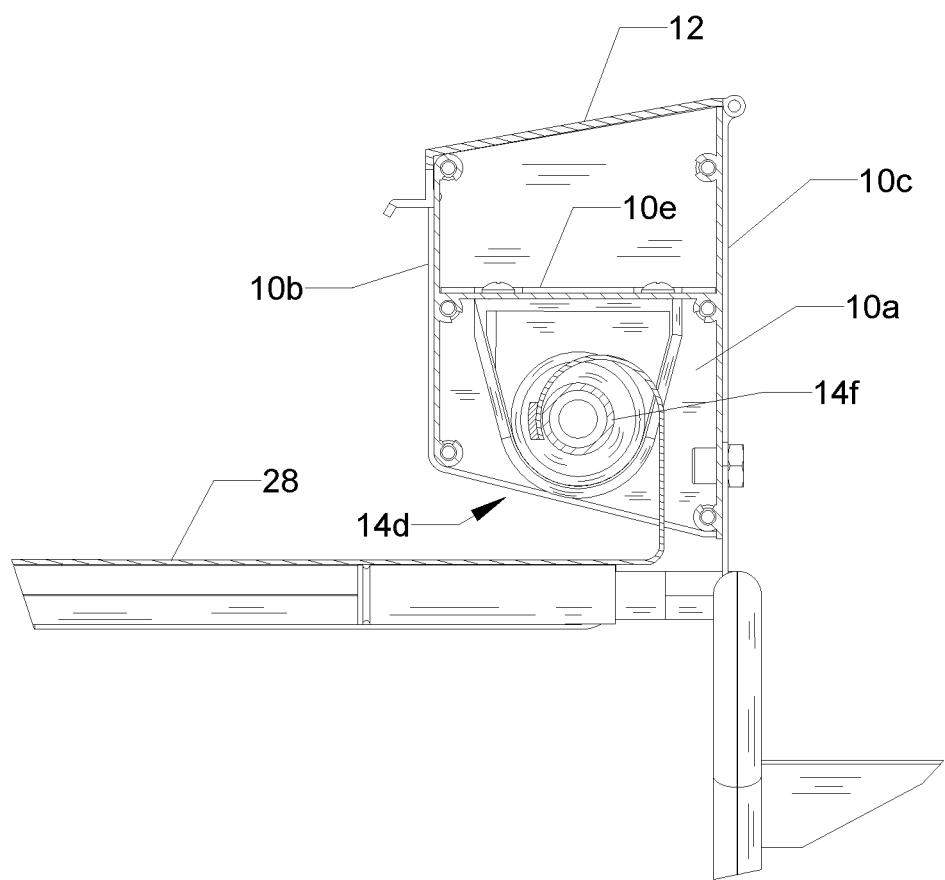
FIG. 9 is a representative illustration of the portable and retractable roof assembly shown mounted to a portion of a trunk of a tree and used with a prior art tree stand, with the cover in a retracted or storage position.
Figure 10:
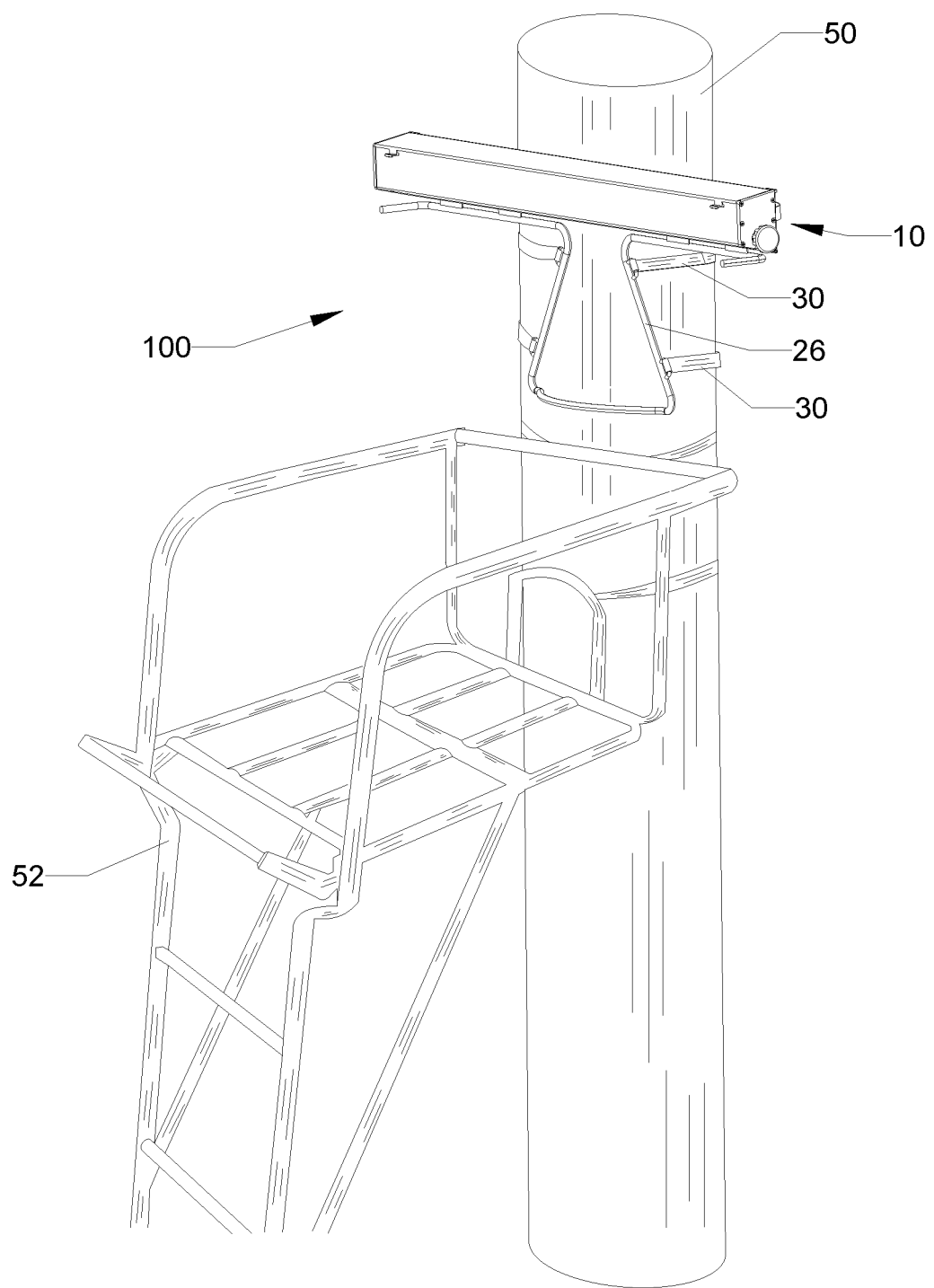
FIG. 10 is a representative illustration of the portable and retractable roof assembly in FIG. 9, shown with a cover in an extended or use position.
Figure 11:
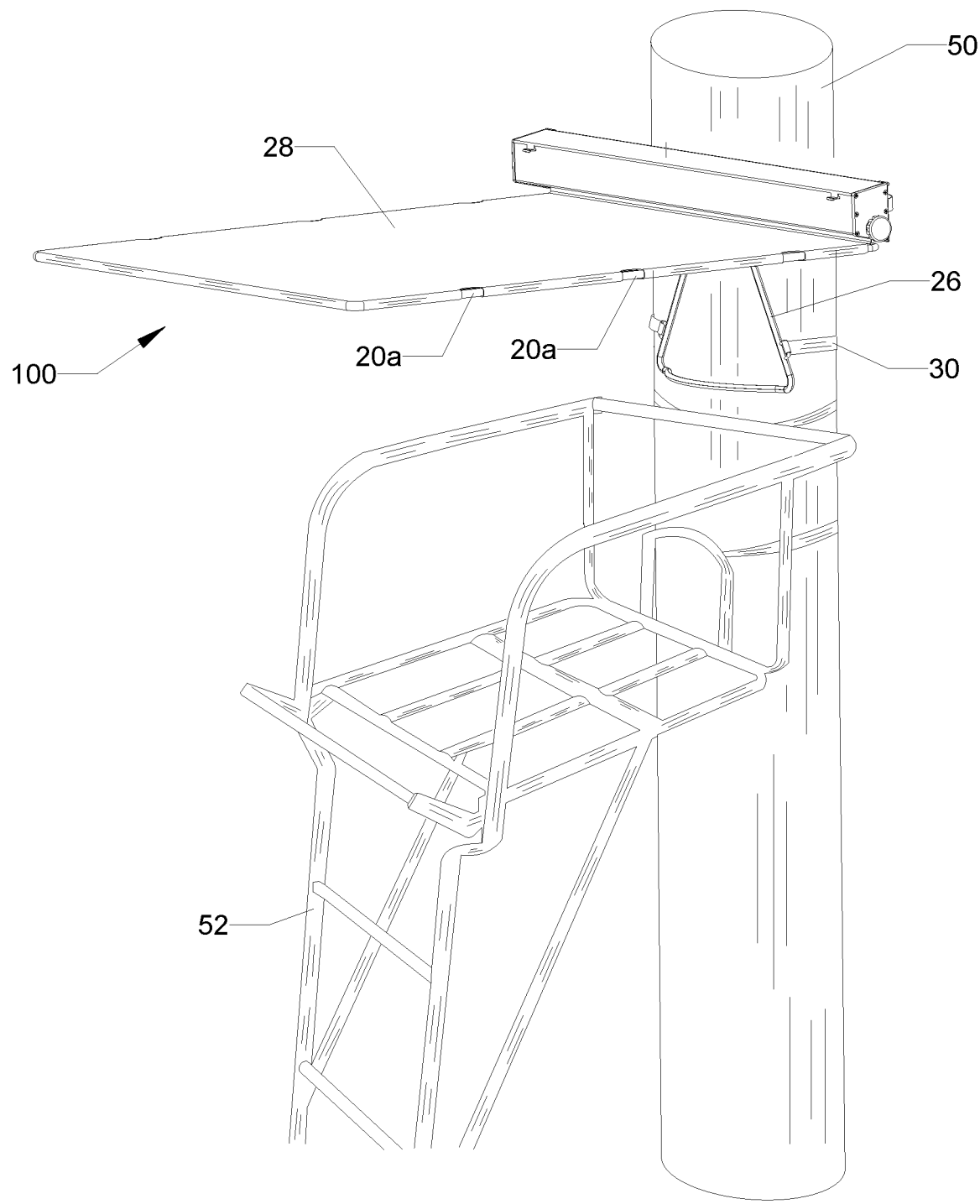
FIG. 11 is a representative illustration of the portable and retractable roof assembly in FIG. 9, shown with the removable side skirts and front skirts in FIG. 3.
Figure 12:
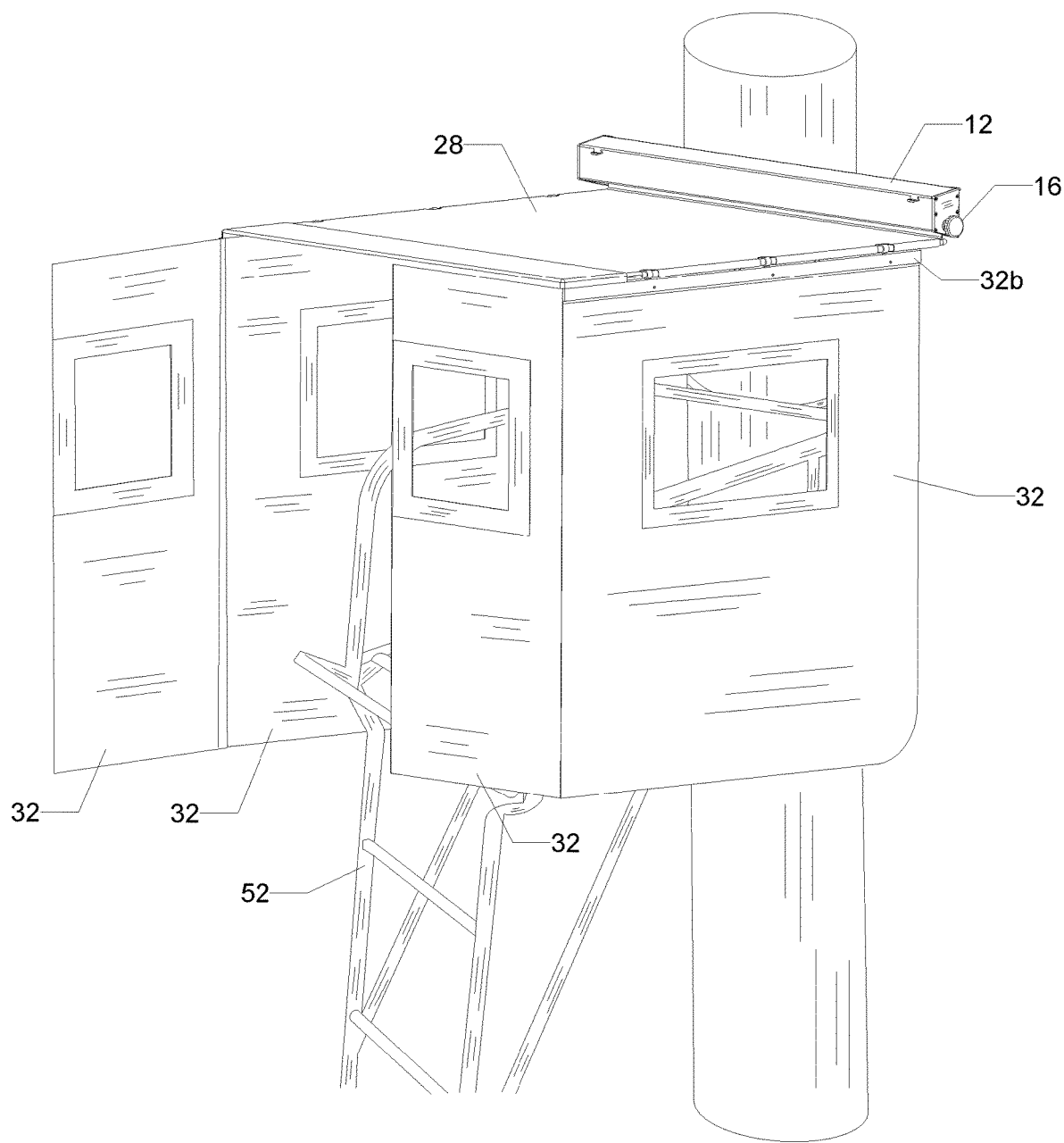
FIG. 12 is a side elevation view of the portable and retractable roof assembly in FIG. 8.
Figure 13:
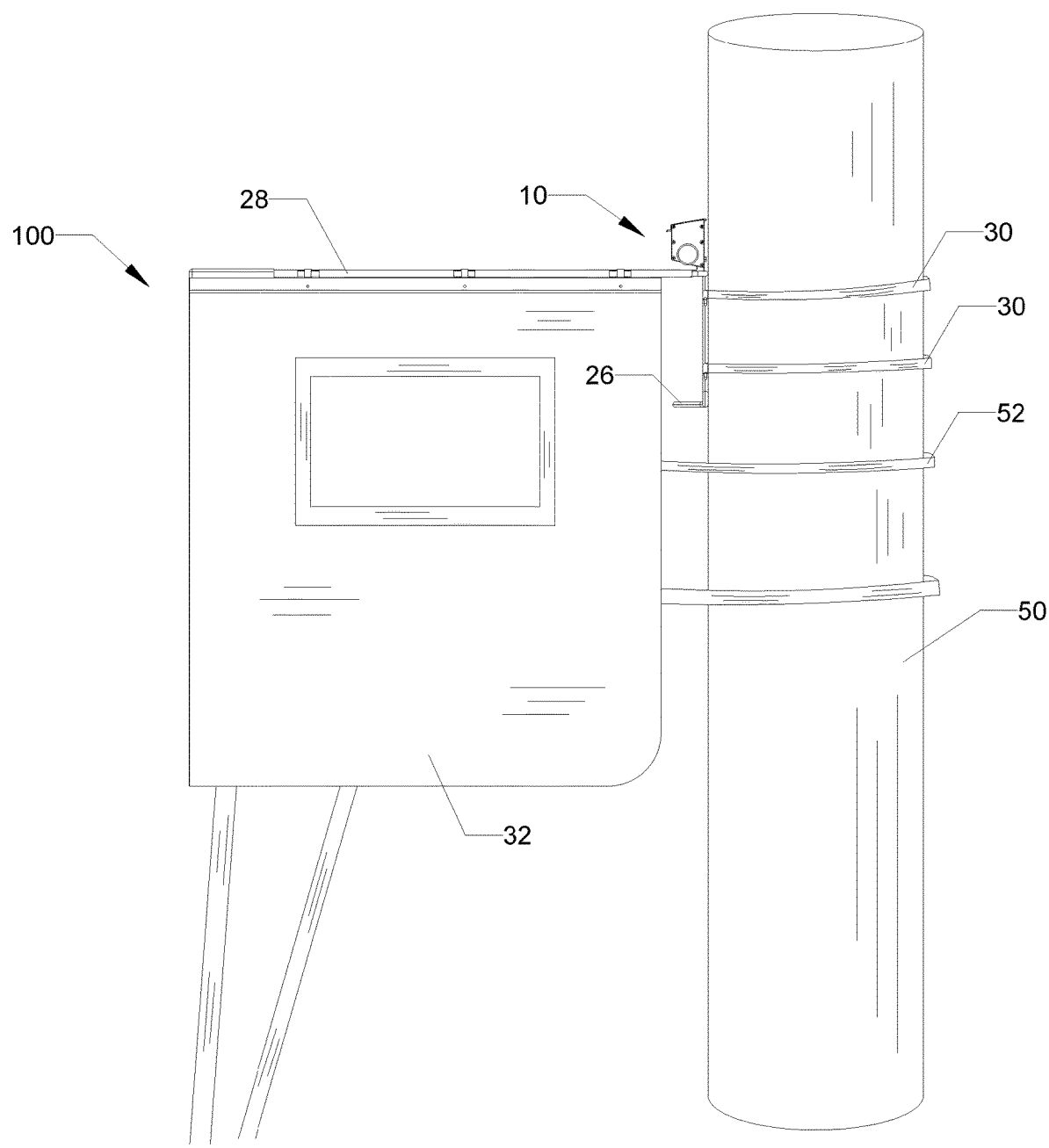
FIG. 13 is a representative illustration of a side elevation view of the portable and retractable roof assembly in FIG. 12.

A portable and retractable roof assembly according to the invention or roof 100 is shown in the accompanying FIGS. 1-12 in a representative embodiment for use as a hunting blind.

The roof 100 is comprised of a retractable cover 28 housed inside a case 10 that is removably mountable to a tree trunk 50 by way of a tree mount 26 and straps 30.

The case 10 is a portable container 10 disposed as an elongated box with three or more long sides, a floor 10e, a lid 12 and a pair of opposed case sides 10a, the long sides and case sides 10a facing outwards, and the floor 10e positioned such that the case 10 has an upper interior storage compartment 10g is formed between the long sides, the case sides 10a and the lid 12, with a lower three sided space with an opening facing downwards (towards a ground level) housed below the floor 12 and forming a spindle housing 10f. The lid 12 is a hinged or otherwise removably attached providing access to the interior storage area of the case 10. A first long side of the case 10b or front side 10b is forward facing away from the trunk 50. A second long side 10c of the case 10 is a tree trunk facing side or tree side 10c of the case 10, to which a tree mount 26 is affixed. A third long side 10d of the case 10 faces downwards, towards a ground surface when the case 10 is mounted to the tree trunk 50, and in the representative embodiment shown, is disposed as an elongated opening 10d between the first long side 10b and the second long side 10c and can be completely open, as shown in the representative embodiment in the FIGS., or be disposed as a removable lower lid element (not shown) that can be hinged or pressure fitted but allows access to a spindle assembly 14 and the cover 28, or alternatively, with an elongated slot formed into the third long side 10d through which the cover 28 is retractably stored or extended but must either be removably affixed or otherwise allow access to the spindle housing 10f area.

The inventor notes that the case 10 can be configured in many different ways, however it is important to have the cover 28 protected from the effects of weather when retracted and in a storage position. Extending the cover 28 from the third long side 10d ensures water does not enter the spindle housing 10f and thus negatively affect the cover 28 and a spindle assembly 14 housed therein. In another embodiment, the case 10 is a simple 5 sided box with a triangular or trapezoidal cross section, with the cover 28 retracting or extending out of an elongated slot formed into one of the long sides at or near a vertex oriented downwards for a triangular shape, with the spindle housing and interior storage compartment are a same interior compartment accessible by opening the lid 12. In the case of a trapezoidal shaped case 10, the opening is parallel to the lid and in space apart relationship.

The spindle assembly 14 is housed inside the spindle housing 10f of the case 10. The spindle assembly 14 is comprised of a spindle bracket 14c, along with a friction disk 14d are attached to the case sides 10a. A spindle end 14e, configured as collared cylinder, is attached to the spindle bracket 14c. A spindle 14f having a first end 14a and a second end 14b is rotatably mounted onto the spindle end 14e at the first end 14a. An aperture 10h formed into one of the case sides 10a allows access to the second end 14b that receives a knob 16 allowing a user (not shown) to manually turn the knob 16 and thus rotate the spindle 14f. The cover 28 has a fixed end and a pull end; the fixed end of the cover is permanently affixed to the spindle 14f and turning the knob 16 winds the cover 28 onto the spindle 14f. The pull end is pulled by the user to extend the cover 28 out of the case 10. An optional guide rod (not shown) is affixed to the spindle brackets 14c in parallel and spaced apart relationship with the spindle 14f to guide and/or flatten the cover 28 as it is retracted into the case 10 and wound onto the spindle 14f as well as to guide the cover 28 when it is pulled and extended out of the case 10.

The inventor notes that the manual cover winding mechanism described herein can be replaced with known mechanisms currently used for roller shade blinds, including motorized mechanisms, springs, etc. as desired and the invention herein is not meant to design a new winding mechanism for the cover 28 but rather is showing one of many known winding mechanisms, all of which can be adapted for use with the roof assembly 100. The spindle assembly 14 in its most simple form is simply a tube or spindle with a knob for rotating the spindle and to which one end of the cover 28 is affixed. The cover 28 is wound around the spindle to retract the cover into the case and store the cover 28, or unwound from the spindle to extend it out of the case. Any mechanical assembly that achieves this function can be used and is part of this invention and disclosure.

The cover 28 is made of a weatherproof and durable fabric, such as nylon. When the cover 28 is extended out of the case 10, the cover 28 is installed on a collapsible frame assembly 20, comprised of a pair of side tubes 20a, a front tube 20c, and cross tubes 20b, along with lateral straps 22 that secure a plurality of side flaps of the cover 28 onto the frame assembly 20. The front tube 20c, side tubes 20a, and cross tubes 20b of the frame assembly 20 are attached with an internal string to allow easy assembly and storage. The frame assembly 20 in the representative embodiment is shown as being held together with a single string for easiest assembly and storage, however in another embodiment, the frame assembly 20 can be comprised of cross and side tubes that are screwed or otherwise fitted together without the internal string.

The frame assembly 20, when not in use, is stored inside the case 10 in the upper interior storage compartment 10g. The front tube 20c and cross tubes 20b fit into the side tubes 20a, with the side flaps of the cover 28 folded over the side tubes 20a and secured by the lateral straps 22. A front of the cover 28 that is handled to retract or extend the cover 28 out of the case 10 is optionally formed with a front flap or pocket 28b adapted to receive the front tube 20c and a portion of each side tube 20a immediately affixed to the front tube 20c. Each side tube 20a is pressure fitted into a tube receiver 26a of the tree mount 26 to attach the assembly frame assembly 20 to the case 10 for mounting purposes.

The tree mount 26 is disposed as a wire frame sized and shaped to fit around a portion of the tree trunk 50 with a pair of adjustable mount straps 30 with buckles or other mating fasteners used to secure straps 30 around the tree trunk 50. The wire frame is attached to the second long side 10c of the case 10 and in the embodiment shown in the FIGS. by four brackets 26b fastened to the second long side 10c or tree trunk facing side of the case 10.

The roof 100 is further comprised of optional side skirts 32 that either attach directly to the side tubes 20a and front tube 20c by clips 32a that clip directly onto the side tubes 20a and front tube 20c and to the skirt 32 or alternatively to detachable rails 32b that clip to the side tubes 20a and to which the skirt 32 is removably affixed. In some embodiments, the skirt 32 is slideably affixed to the rail, allowing the user to adjust the skirt 32 in a same way that curtains can be adjusted on a curtain rod. This embodiment is especially useful when the skirt 32 has no window, or for ventilation purposes. One or more skirts 32 may also be attached to the front tube 20c to create a three sided hunting blind with a roof, using a total of four skirts 32 as shown in the representative embodiment in the FIGS. When not in use, the rail 32b and skirts 32 are stored inside the upper interior storage compartment 10g of the case 10.

A method of using the roof 100 is shown in the FIGS. To use the roof 100, the user finds a suitable tree and determines a desired height for the roof 100. The roof 100 is mounted to the tree trunk 50 by positioning the tree mount 26 against the tree trunk 50, and then wrapping the straps 30 of the tree mount 26 around the tree trunk 50, securing them with a buckle or another suitable fastener. The straps 30 must be pulled tight to support the roof 100 and the representative embodiment shown features two straps 30 but a single widened strap can also be used.

The user then opens the lid 12 of the case 10, removes and assembles the frame assembly 20, securing it to the tube receivers 26a of the tree mount 26, and then pulls the cover 28 out of the case 10, fitting the front tube 20c of the frame assembly 20 into the front pocket 28b of the cover 28, with the cover 28 supported by the cross tubes 20b. Side flaps 28a of the cover 28 are folded over the side tubes 20a secured thereto by the lateral straps 22 or other suitable means. The lateral straps 22 provide further strength and support to the cover 28 and frame assembly 20.nn The skirt 32 is attached to the side tubes 20a, front tube 20c, or to the rail 32b by clips 32a. In the FIGS., the roof 100 is configured as a hunting blind installed on the tree trunk over a tree stand 52, but it could also be used on a ground surface mounted to the tree trunk, serving as a hunting blind, small tent, or other shelter against inclement weather.

The case 10 is adapted to store a number of other items, and the user could securely store knives, flashlights, and other items in the case 10, when used with an optional lid lock (not shown). When not in use, the skirts 32, frame assembly 20 and cover 28 are stored inside the upper interior storage compartment 10g of the case 10, where they are protected from the elements, and the roof 100 can be either left in place or taken down and removed, as desired.

The roof 100 is particularly useful for hunters who visit a same tree stand each hunting season, where the roof 100 can be installed in a semi-permanent fashion and extended or retracted quickly and easily. Even when used temporarily, the roof 100 is easily and quickly set up and taken down, unlike most hunting blinds that are left up after installation because installation/storage is inconvenient or cumbersome. Many hunters set up their hunting blinds once and leave them up continuously because of this inconvenience, and consequently, the blinds are damaged quickly by sun and wind and must be replaced. Given the expense of these blinds, the inventor was inspired to create a roof that could be adapted to be a hunting blind that would solve the problems of the prior art.

It is to be understood that the above-described arrangements are only illustrative of the application of the principles of the present invention. Numerous modifications and alternative arrangements may be devised by those skilled in the art without departing from the scope of the present invention.

The inventor notes that the roof 100 can be adapted to many other uses. For instance, the cover 28, frame assembly 20, spindle assembly 14 and case 10 can be adapted for use with a tent. The tent is affixed to the cover 28, which in this embodiment is disposed as an outdoor-grade tarp affixed to the spindle 14*f*, with the frame assembly 20, this case disposed as tent poles stored inside the case 10. The cover is extended out of the case 10, either using manual or motorized means, again similar to a roller blind mechanism or other known roller mechanisms. The frame assembly 20 is assembled and inserted into the tent and the tent is now assembled and ready to use far more quickly than would be otherwise possible. To store the tent, the steps are reversed, and the cover is carefully rolled back up onto the spindle 14*f* inside the case 10, and the frame assembly 20, and other accessories are stored back inside the case 10. The case 10 can be positioned on the ground surface when the cover is extended or retracted or positioned inside a truck bed for even easier and ergonomic use.

In a representative embodiment, the roof 100 is comprised of a 48 inch long aluminum spring tensioned spindle 14*f*. The tarp is sized to support a 5½×8 foot tent affixed thereto. The tent is folded with 4 hook and loop tabs used to hold in place and then rolled onto the spindle 14*f*. The roof 100 includes a set of optional foldable legs and two pins to disconnect from a rack of an all-terrain vehicle or ATV. This size works well for a 2-person tent, and the inventor notes that a spindle 28 inches long works well for a single person tent.

The 28 inch long spindle 14*f* is also a good size for use with an ATV and is an idea cover for a golf cart. The inventor notes that the roof 100 ideally includes a bungee cord to pull the cover 28 snugly around tires of the golf cart. Golf cart cover dimensions are generally 108 inches long and the inventor notes that an added 4 foot long flap sewn to the back of cover 28 to help guide the cover 28 during retraction. For use as a cover for a golf cart or other vehicle, the case 10 can be positioned and secured inside a trunk area of the vehicle, and the cover extended over the vehicle, as needed. The retracted cover is conveniently stored inside the case 10 inside the trunk or bed area of the vehicle.

The inventor also notes that while his cover 28 is typically made of a durable, weather resistant fabric, many other materials can be used, including covers made of sectionalized metal pieces now used for security door and window coverings. The case 10 and spindle assembly 14 will naturally be sized and configured accordingly. While the intent of the inventor's roof 100 is to provide a temporary, inexpensive and stowable roof system, larger and more durable systems can be made using his method and assembly as described herein without departing from the invention.

I claim:

1. A portable roof for mounting to a trunk of a tree, comprising:
   a case disposed as an elongated box having a lid and a front side, a tree side, and a pair of sides joining the front side to the tree side, with the lid, front side and tree side defining an interior space, and an elongated opening;
   wherein the lid is disposed as a removable lid allowing access to the interior space of the box;
   wherein the tree side is a tree trunk facing side;
   a spindle housed in the interior space and rotatably affixed thereto;
   a cover having a free end and a fixed end;
   wherein the fixed end is affixed to the spindle;
   wherein the free end is extendable out of the elongated opening so as to be in an extended position;
   a frame assembly having a pair of side tubes and at least one cross tube removably affixed to the pair of side tubes so as to be perpendicular to the side tubes and approximately parallel with the front facing side;
   wherein each side tube of the pair of side tubes is further comprised of a front end and a back end;
   wherein the cover in the extended position is supported by the frame assembly;
   wherein the cover is removably secured to the frame assembly; and
   a tree mount disposed as a frame having a first end, a second end, and a trunk engaging portion positioned between the first end and the second end, each of the first end and the second end terminating in a receiver mateable with the back end of one of the side tubes of the frame assembly.

2. The portable roof in claim 1, wherein the case is further comprised of a floor having a top side and a bottom side, the floor positioned so as to divide the interior space into an upper interior storage area having five sides and a lid with the top side of the floor inside the upper interior storage area, and a lower interior storage area disposed as a five sided spindle housing, with the elongated opening in the case providing access to the spindle housing.

3. The portable roof in claim 2, further comprising a lower lid removably affixed to the front facing side and the tree facing side and opposite the lid so as to cover the lower spindle housing of the case.

4. The portable roof in claim 1, wherein the case has a trapezoidal cross section and the elongated opening is positioned so as to be parallel to the lid.

5. The portable roof in claim 1, further comprising a second lid removably covering the elongated opening.

6. The portable roof in claim 1, further comprising a skirt portion removably attached to one of the pair of side tubes.

7. The portable roof in claim 1, wherein the frame assembly is further comprised of a front tube perpendicular to and attach to the front ends of the pair of side tubes.

8. The portable roof in claim 1, wherein the spindle is further comprised of a first spindle end and a second spindle end, and a knob affixed to either the first spindle end or to the second spindle end, whereby rotating the knob rotates the spindle in a same direction of rotation as that of the knob.

9. The portable roof in claim 1, wherein the spindle is rotatable using a motor assembly.

10. The portable roof in claim 1, wherein one side tube of the pair of side tubes and the at least one cross tube are further attached to one another by a non-removable elasticized string.

11. The portable roof in claim 6, further comprising a detachable rail adapted to attach to one side tube of the pair of side tubes and to which the skirt portion is removably affixed.

12. The portable roof in claim 1, wherein the cover is made of a weather resistant material.

13. A method of using a portable roof having a case, a tree mount attached to the case so as to be mountable to a trunk of a tree, a frame assembly, and a retractable cover rotatably housed inside the case and rotatably extended out of the case and supported by the frame assembly so as to form a temporary roof structure, the method comprising the steps of:
   mounting the portable roof to the trunk;
   assembling the frame assembly;
   attaching the assembled frame assembly to either the case or to the tree mount; and
   extending the cover from the case above the frame assembly,
   whereby the cover is supported by the frame assembly.

14. The method in claim 13, further comprising the step of:
   attaching the cover to the frame assembly;
   after the step of extending.

15. The method in claim 14, further comprising the steps of:
   detaching the cover from the frame assembly;
   after the step of attaching the cover; and
   retracting the cover into the case;
   after the step of detaching the cover.

* * * * *